TUNABLE MAGNETRON DEVICE

Filed Oct. 6, 1949 2 SHEETS—SHEET 1

INVENTORS
WINSTON M. GOTTSCHALK
ROBERT E. CHAFFEE
BY [signature]
ATTORNEY

INVENTORS
WINSTON M. GOTTSCHALK
ROBERT E. CHAFFEE
BY Elmer J. Gorn
ATTORNEY

Patented Feb. 17, 1953 2,629,068

UNITED STATES PATENT OFFICE 2,629,068

TUNABLE MAGNETRON DEVICE

Winston M. Gottschalk, Watertown, and Robert E. Chaffee, Wellesley, Mass., assignors to Raytheon Manufacturing Company, Newton, Mass., a corporation of Delaware

Application October 6, 1949, Serial No. 119,804

10 Claims. (Cl. 315—39)

1

This application relates to electron discharge devices and more particularly to microwave oscillators of the magnetron type.

In prior magnetron designs, tunable over a wide range, spurious oscillations were encountered which approached the frequency of the desired resonant mode of operation of the magnetron. Presence of these spurious oscillations has been found to sap power from the desired frequency, thus lowering the efficiency of operation of the tube, if indeed operation is at all possible, and causing the tube to overheat.

Applicants have discovered that these spurious oscillations are due to resonances of the tuning structure and further that these oscillations may be moved to a position in the frequency spectrum well above the operating frequency of the magnetron where they will not sap power from the main frequency. This is accomplished by insulating each of the tuning elements from the adjacent tuning elements of the tuning structure. The result is that each pair of adjacent tuning elements becomes equivalent to a section of transmission line having an open termination, and the lowest frequency at which this section of transmission line will operate is the frequency at which the transmission line is substantially equal to a half wave length of said frequency. Thus a tuning structure may be produced wherein the tuning elements are relatively short, thereby forming a rigid structure, and the lowest parasitic frequency of said structure will be well above the operating frequency of the magnetron.

Furthermore, applicants have devised a method of insulatingly supporting the tuning elements which is particularly useful in carrying out this invention. This comprises coating insulating elements with a thin film of a metal, said film acting as the tuning element while the insulating member provides the rigid support.

It is well known that magnetrons may be tuned by simply tuning their resonant cavity structure, while holding both the magnetic field across the electron discharge path and the potential difference between the cathode and anode constant, but this procedure requires that the magnetron anode current vary with the wave length of operation.

In order to maintain both voltage and current constant, the magnetic field should be varied in accordance with the relationship:

$$B=\frac{6.7\sqrt{V}Dr_a}{r_a^2-r_c^2}$$

2 wherein $B$=magnetic field applied across the electron discharge path transverse to the direction of motion of the electrons;

$V$=the potential difference between the anode and cathode structure;

$D$=Allis' parameter which is dependent on the design of the tube and is substantially proportional to the wave length of operation of the magnetron $\lambda$;

$r_a$=radius of the hole in the anode structure concentric with the cathode;

$r_c$=radius of the cathode.

Since $r_a$ and $r_c$ are fixed by the geometry of the tube, and it is desired to operate with a constant voltage V, the expression reduces to:

B is proportional to D, and, since D is proportional to $\lambda$, B is proportional to $\lambda$, or $$\frac{B}{\lambda}=K$$

where K is constant.

In order to vary the magnetic flux with the wave length of operating frequency, a movable magnetic pole is mechanically attached to the tuning structure such that, upon insertion of the tuning structure in the cavities of the cavity resonator, the gap between the movable magnetic pole and a fixed magnetic pole on the opposite side of the electron path is decreased, thereby increasing the magnetic flux applied across the electron path.

Applicants have further devised a structure whereby losses in the tuning elements may be substantially eliminated. This comprises inserting the insulating members into the cavities without the metallic coating thereon. In this case tuning is accomplished by changing the dielectric constant between the anode elements.

These and other advantages of this invention will become apparent as the description thereof progresses, reference being had to the accompanying drawings wherein.

Figure 1:
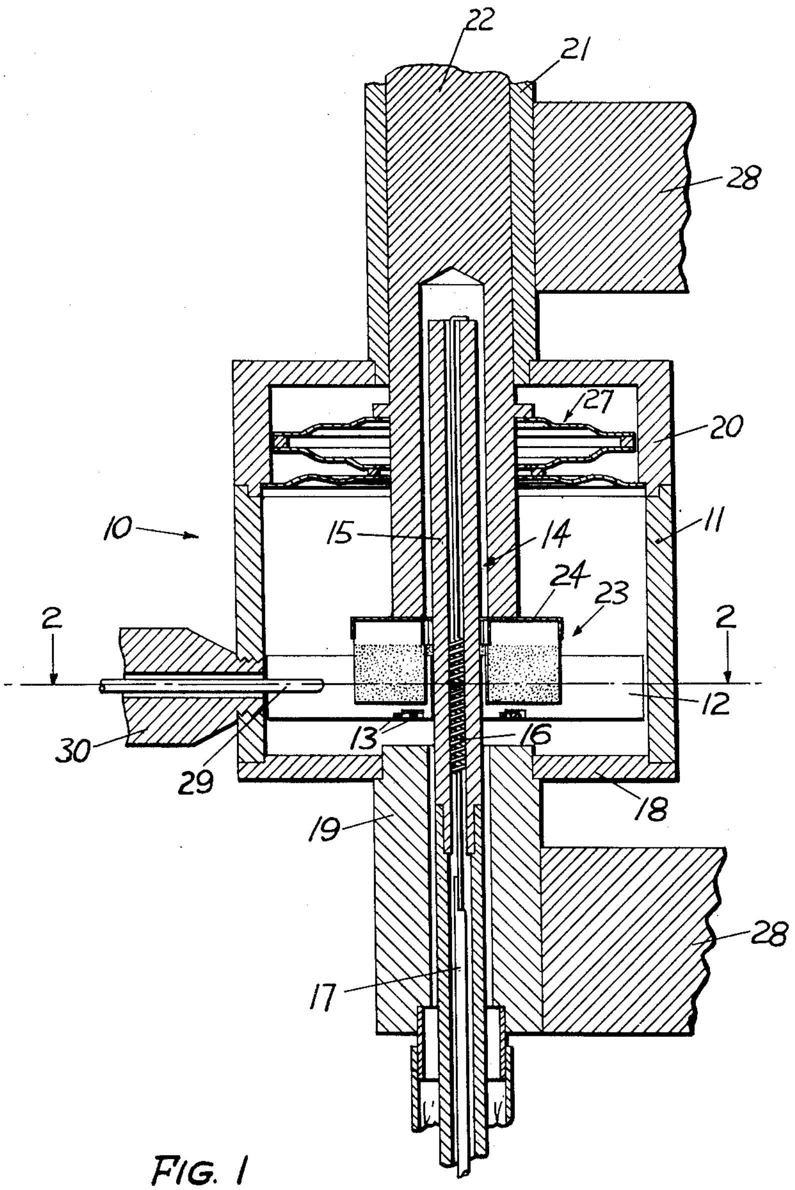
Fig. 1 illustrates a longitudinal cross-sectional view of a magnetron utilizing the invention taken along line 1—1 of Fig. 2.
Figure 2:
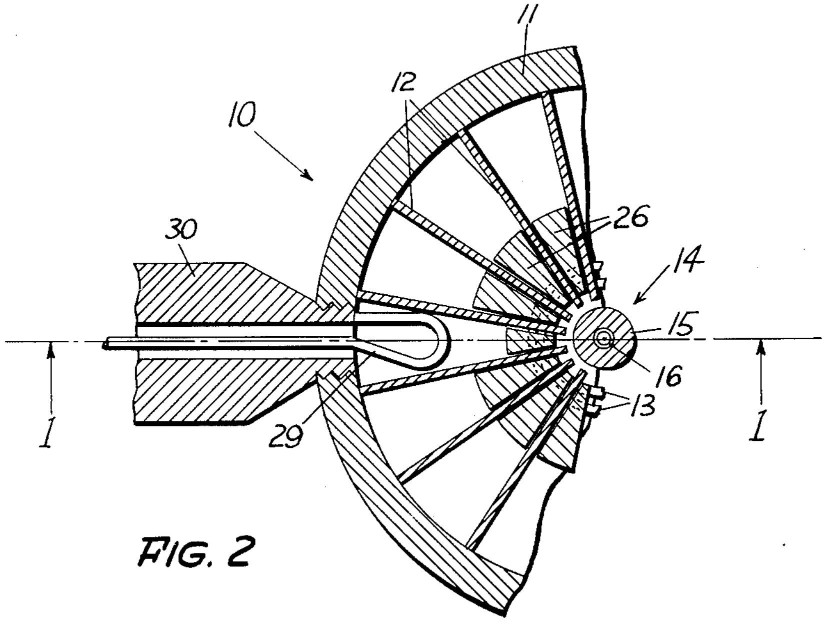
Fig. 2 illustrates a representative portion of a transverse cross-sectional view of the device shown in Fig. 1 taken along line 2—2 of Fig. 1.

Referring now to Figs. 1 and 2, there is shown a magnetron comprising an evacuated anode structure 10 which is made up of a cylindrical member 11 which may be of any desired metal such as copper. Extending radially inwardly from the inner surface of anode cylinder 11 is a plurality of anode members 12 comprising substantially rectangular members whose planes are parallel to the axis of cylinder 11. Each pair of adjacent anode members, together with that portion of the cylindrical anode structure included therebetween, defines a resonant cavity.

In order to prevent spurious oscillations, due to undesired resonances in the anode structure itself, alternate anode members are connected together at their inner ends by straps 13 connected to the lower edges thereof.

A cathode structure 14, which extends through the center of anode structure 10 concentric therewith, comprises a metal cylindrical rod 15 which is coated with electron emissive material where it passes through anode members 12. The cathode structure is heated by a coiled resistance wire 16, the upper end of which is attached to metal cylinder 15 and the lower end of which is attached to a lead-in member 17. The heater coil 16 and lead-in 17 are insulated from cylinder 15 by any desired means, such as by coating said elements with an insulating coating, for example, Alundum.

The lower end of anode cylinder 11 is closed by an end plate 18 which is rigidly attached to cylinder 11 by any desired means, such as soldering. End plate 18 has a hole in the center thereof through which extends a pole piece 19 which may be of ferromagnetic material, such as iron. Pole piece 19 has a hole in the center thereof which allows the passage of cathode cylinder 15 therethrough. Cathode cylinder 15 is insulatingly supported with respect to pole piece 19 by means of an insulating seal, not shown, in a well-known manner. Lead-in member 17 may be similarly supported with respect to cathode cylinder 15 by means of a second insulating seal.

The upper end of anode cylinder 11 is closed by a bell-shaped end member 20 which has a central aperture therein concentric with cathode 14 and anode structure 10. Inserted in said hole is an upper pole piece 21 of ferromagnetic material which, as shown here, is substantially cylindrical in form. Pole piece 21 is rigidly attached to upper end plate 20. Inside pole piece 21 is a movable pole piece 22 of magnetic material which extends downwardly through pole piece 21 into the interior of anode structure 10. The lower end of pole piece 22 has a cylindrical recess therein coaxial with cathode cylinder 15, and of sufficient size to accommodate the upper end of cathode structure 14. The lower end of movable pole piece 22 is movable to within a short distance of the upper edges of anode member 12 and has attached thereto a tuning structure 23.

Figure 3:
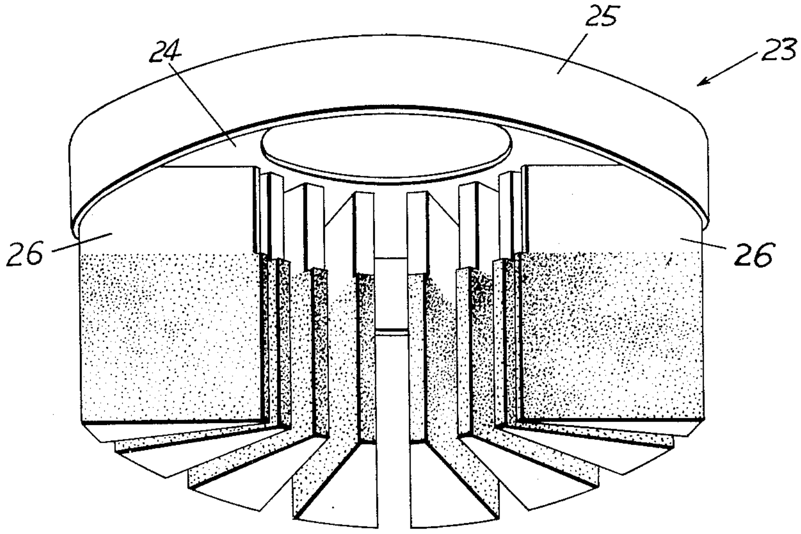
Fig. 3 illustrates a partially broken away perspective view of the tuning structure utilized in the device of Figs. 1 and 2.

Referring now to Fig. 3, there is shown the details of tuning structure 23. This structure includes a supporting plate 24 which is attached as by welding to the lower end of magnetic pole piece 22. Plate 24, whose plane is transverse to the axis of cathode cylinder 15, has a hole therein coaxial with cathode cylinder 15 which is substantially equal in diameter to the recess in movable pole piece 22. Plate 24 extends outwardly toward anode cylinder 11 for approximately half the distance from cathode cylinder 15 to anode cylinder 11.

At its outer edge plate 24 is attached as by welding to a positioning ring 25 which extends downwardly from plate 24 and is rigidly secured thereto as by welding. Inside ring 25 and extending downwardly from plate 24 is a plurality of tuning elements 26 which may be made of any insulating material such as, for example, the ceramic, zircon. Each tuning element 26 has a transverse cross section which is substantially trapezoidal such that it will conform to the shape of the space between the anode members 12. The elements 26 have a substantially rectangular section in the plane parallel to the axis of cathode 14 and extend downwardly below the lower edge of positioning ring 25 for a distance somewhat greater than the height of each of the anode members 12. When tuning elements 26 are inserted into the spaces between the anode members 12, they will increase capacitance between the inner ends of said members by increasing the dielectric constant of the space therebetween, thereby lowering the frequency of operation of the device. Thus a variable frequency magnetron may be produced by making tuning elements 26 movable with respect to the anode elements 12.

The effective tuning range of the device may be further increased by coating the flat surfaces of the elements 26, which are adjacent anode members 12, and the inner edge with a conductive material on the portions of elements 26 below positioning ring 25. This conductive coating may be applied in any manner and may be of any desired material, such as, for example, a metal powder such as molybdenum, silver, nickel, copper or iron sprayed on tuning elements 26 with a liquid binder, and then sintered to tuning elements 26 by heating. When the tuning elements 26 are inserted into the cavities between the anode members 12, they decrease the effective distance between the surfaces of the inner ends of adjacent anode members, thereby increasing the capacitance.

Since the conductive material is positioned adjacent the anode members 12 near their inner ends where current fields are relatively low, losses in the tuning structure will be small. The conductive portions of the tuning elements 26 have a substantial V-shape cross section, and are insulated from adjacent tuning elements by the uncoated portions of the tuning elements which are attached to plate 24 and ring 25.

To resonate, the length of the effective transmission line formed by adjacent tuning elements must be equal to a half wave length, and this length, which is substantially the height of the coated portions of elements 26, may be easily reduced to a point where the resonant frequency of the tuning structure will fall well above the operating frequency of the magnetron.

While this invention teaches the use of tuning structures which vary the frequency of the magnetron by varying the capacitance of resonant cavities, inductive tuning structures may be used by placing the tuning elements near the outer ends of the anode members 12 in the high current regions of the cavities. Inductive tuning structures may have their parasitic resonance paths eliminated by the same means as taught here in connection with capacitive tuning elements, namely, by making the tuning elements electrically insulated from each other such that they behave as open terminated transmission lines.

In order to maintain a vacuum seal between movable pole member 22 and anode cylinder 11, a diaphragm 27 is connected between anode member 11 and movable pole piece 22, the details of which are more completely described in the copending application, Serial No. 793,889 filed December 26, 1947.

A source of magnetic flux 28, such as a permanent magnet or an electromagnet, is applied between pole pieces 21 and 19, thereby creating the requisite flux across the interaction space between the cathode 14 and the inner ends of anode members 12. Movement of pole piece 22 varies the magnetic flux with variations of frequency to produce optimum operating conditions throughout the tunable range of frequencies.

Energy is withdrawn from the magnetron structure in a well-known manner by a loop 29 inserted into one of the cavities, one end of which is connected to a metallic tube 30 threaded into anode cylinder 11 and the other end of which extends by a lead-in member through the center of tube 30 and is supported therefrom by an insulating seal, not shown, in a well-known manner.

When a suitable potential is applied between the anode structure 10 and cathode structure 14, electrons emitted from the surface of cathode cylinder 15 will interact with the magnetic flux produced by pole pieces 22 and 19 and thereby generate microwave energy in the cavities formed by anode element 12 in a well-known manner. The device may be tuned by moving magnetic pole piece 22 and tuning structure 23 into and out of the cavities of the anode structure, thereby varying the frequency of said device.

This completes the description of the species of the invention illustrated herein. However, many modifications thereof will be apparent to persons skilled in the art without departing from the spirit and scope of this invention. For example, different shapes of cavities and tuning structures may be used and other cathodes may be substitutes for that shown. In addition, the magnetic pole structure 22 may be made stationary and an additional structure may be used to movably support tuning structure 24 with respect to the anode structure. Therefore, applicant does not wish to be limited to the particular details of the invention described herein except as defined by the appended claims.

What is claimed is:

1. An electron discharge device comprising an anode structure, a cathode adjacent said anode structure, said anode structure defining a cavity resonator having a plurality of cavities, and a tuning structure having a plurality of tuning elements comprising conductive material positioned adjacent said cavity resonator and movable with respect to said cavity resonator, each of said tuning elements extending into a cavity of said resonator, each pair of adjacent tuning elements comprising an electrical circuit, all of the resonance frequencies of said circuit being remote from the operating frequency of said resonator over the range of operating frequencies of said device.

2. An electron discharge device comprising an anode structure, a cathode adjacent said anode structure, said anode structure defining a cavity resonator having a plurality of cavities, and a tuning structure having a plurality of tuning elements movably positioned with respect to said cavity resonator, each of said tuning elements comprising an insulating member partially coated with conductive material, the conductive material of each element being electrically insulated from the conductive material of adjacent elements, each pair of adjacent tuning elements comprising an electrical circuit, all of the resonance frequencies of said circuit being remote from the operating frequency of said resonator over the range of operating frequencies of said device.

3. An electron discharge device comprising an anode structure, a cathode adjacent said anode structure, said anode structure defining a cavity resonator having a plurality of cavities, and a tuning structure having a plurality of tuning elements movably positioned with respect to said cavity resonator, each of said tuning elements comprising an insulating member partially coated with conductive material, and the conductive material of each of said tuning elements being insulated from conductive material of adjacent tuning elements, each pair of adjacent tuning elements comprising an electrical circuit, all of the resonance frequencies of said circuit being remote from the operating frequency of said resonator over the range of operating frequencies of said device.

4. An electron discharge device comprising an anode structure, a cathode adjacent said anode structure, said anode structure defining a cavity resonator having a plurality of cavities, and a tuning structure having a plurality of tuning elements movably positioned with respect to said cavity resonator, each of said tuning elements comprising an insulating member having a dielectric constant substantially greater than unity and partially coated with conductive material, each pair of adjacent tuning elements comprising an electrical circuit, all of the resonance frequencies of said circuit being remote from the operating frequency of said resonator over the range of operating frequencies of said device.

5. An electron discharge device comprising an anode structure, a cathode adjacent said anode structure, said anode structure defining a cavity resonator having a plurality of cavities, and a tuning structure having a plurality of tuning elements movably positioned with respect to said cavity resonator, each of said tuning elements being insulated from adjacent tuning elements, each pair of adjacent tuning elements comprising an electrical circuit, all of the resonance frequencies of said circuit being remote from the operating frequency of said resonator over the range of operating frequencies of said device, and each pair of adjacent tuning elements being equivalent to an open terminated transmission line.

6. An electron discharge device comprising an anode structure, a cathode adjacent said anode structure, said anode structure defining a cavity resonator having a plurality of cavities, and a tuning structure having a plurality of tuning elements movably positioned with respect to said cavity resonator, each of said tuning element being insulated from adjacent tuning elements, each pair of adjacent tuning elements comprising an electrical circuit, all of the resonance frequencies of said circuit being remote from the operating frequency of said resonator over the range of operating frequencies of said device, and each pair of adjacent tuning elements being equivalent to an open terminated transmission line whose length is substantially less than one-half wave length of the operating frequency of said device.

7. An electron discharge device comprising an anode structure, a cathode adjacent said anode structure, said anode structure defining a cavity resonator having a plurality of cavities, and a tuning structure having a plurality of tuning elements movably positioned with respect to said cavity resonator, each of said tuning elements comprising an insulating member partially coated with conductive material, the conductive material of each of said tuning element being insulated from adjacent tuning elements, each pair of adjacent tuning elements comprising an electrical circuit, all of the resonance frequencies of said circuit being remote from the operating frequency of said resonator over the range of operating frequencies of said device.

8. An electron discharge device comprising an anode structure, a cathode adjacent said anode structure, said anode structure defining a cavity resonator having a plurality of cavities, and a tuning structure having a plurality of tuning elements movably positioned with respect to said cavity resonator, each of said tuning elements comprising an insulating member partially coated with conductive material, the conductive material of each of said tuning element being insulated from adjacent tuning elements, each pair of adjacent tuning elements comprising an electrical circuit, all of the resonance frequencies of said circuit being remote from the operating frequency of said resonator over the range of operating frequencies of said device, and each pair of adjacent tuning elements being equivalent to an open terminated transmission line.

9. An electron discharge device comprising an anode structure, a cathode adjacent said anode structure, said anode structure defining a cavity resonator having a plurality of cavities, and a tuning structure having a plurality of tuning elements movably positioned with respect to said cavity resonator in the high capacity region of said resonator, each of said tuning elements comprising an insulating member partially coated with conductive material, the conductive material of each of said tuning element being insulated from adjacent tuning elements, each pair of adjacent tuning elements comprising an electrical circuit, all of the resonance frequencies of said circuit being remote from the operating frequency of said resonator over the range of operating frequencies of said device, and each pair of adjacent tuning elements being equivalent to an open terminated transmission line whose length is substantially less than one-half wave length of the operating frequency of said device.

10. An electron discharge device comprising an anode structure and a cathode adjacent said structure, said anode structure defining a cavity resonator, a tuning structure movably positioned with respect to said cavity resonator, said tuning structure being non-resonant over the frequency range of operation of said electron discharge device, an element of said tuning structure extending into each cavity of said cavity resonator, said tuning element comprising a rod having a V-shaped cross-sectional area, and positioned in the high capacity area of said cavity adjacent the cathode, and having the apex of the V pointed toward the cathode, a rod of magnetic material movable in conjunction with said tuning structure, for varying the magnetic flux applied across the electron path of said discharge device, with variations in the resonant frequency of said cavity resonator.

WINSTON M. GOTTSCHALK.
ROBERT E. CHAFFEE.

REFERENCES CITED

The following references are of record in the file of this patent:

UNITED STATES PATENTS

| Number | Name | Date |
|---|---|---|
| 2,408,237 | Spencer | Sept. 24, 1946 |
| 2,422,465 | Bondley | June 17, 1947 |
| 2,449,794 | Steele, Jr. | Sept. 21, 1948 |
| 2,451,825 | Guarrera | Oct. 19, 1948 |
| 2,495,744 | Litton | Jan. 31, 1950 |
| 2,508,576 | Kusch | May 23, 1950 |